United States Patent Office.

HORACE M. HEDDEN, OF WORCESTER, MASSACHUSETTS.

Letters Patent No. 100,291, dated March 1, 1870.

IMPROVEMENT IN FERROTYPE PLATES.

The Schedule referred to in these Letters Patent and making part of the same.

*Know all men by these presents:*

That I, HORACE M. HEDDEN, of the city and county of Worcester, and Commonwealth of Massachusetts, have invented a certain new and useful Improvement in Ferrotypes; and I do hereby declare that the following is a full, clear, and exact description of the same.

My improvement has reference to a particular mode of preparing or covering the iron plate upon which the sun picture is taken, whereby a more life-like appearance is given to the latter, as will be hereafter explained.

Ferrotypes, as heretofore prepared, have been covered with a black varnish or japan, and manufacturers have vied with each other in their attempts to produce the richest and most perfect black covering or coating upon such plates, a black color having been considered, both by the trade and by photographers, as essential to the production of a good picture.

From a series of experiments I have found that the above theory is incorrect, and that a ferrotype made according to my invention, which discards the importance attached to the black color, will produce a picture far superior and more life-like.

The plates of sheet-iron, when prepared according to my invention, are covered by a coating of India red and linseed-oil, prepared as follows, for example:

Take twenty gallons of linseed-oil and fourteen pounds of India red, and boil them together until a thick paste-like substance is produced, and when cold reduce the same with twenty gallons of benzole.

The composition thus produced is applied to the surface of the plates in the ordinary manner of preparing plates with black japan, and therefore does not require further description.

The flesh-like appearance given to the color of the plate by use of India red renders the picture taken thereon more life-like and natural than pictures taken on black plates. There is a delicate shading, both to the drapery and to the outlines of the picture, which is not produced when the black plate is used, and which appears in striking contrast with the sharp and harsh expression produced by the black-colored plate.

I am aware that "melainotype" plates have been prepared with a varnish composed of a lamp-black base, varied by the introduction of other coloring matter, an illustration of which is found in the patent to Smith, dated February 19, 1856.

I do not claim preparing ferrotype plates by such process, but, on the contrary, I dispense entirely with the lampblack base, which has heretofore in all instances been deemed indispensable.

Having thus described my improvements in ferrotypes,

What I claim therein as new and of my invention, and desire to secure by Letters Patent, is—

A ferrotype covered by a coating composed of linseed-oil and India red, substantially as and for the purposes set forth.

HORACE M. HEDDEN.

Witnesses:
   THOS. H. DODGE,
   ALBERT E. PEIRCE.